(12) United States Patent
Okayasu et al.

(10) Patent No.: US 7,603,241 B2
(45) Date of Patent: Oct. 13, 2009

(54) LIGHT RECEIVING APPARATUS, TESTING APPARATUS, LIGHT RECEIVING METHOD, TESTING METHOD, TEST MODULE AND SEMICONDUCTOR CHIP

(75) Inventors: Toshiyuki Okayasu, Tokyo (JP); Daisuke Watanabe, Tokyo (JP)

(73) Assignee: Advantest Corporation, Tokyo (JP)

( * ) Notice: Subject to any disclaimer, the term of this patent is extended or adjusted under 35 U.S.C. 154(b) by 126 days.

(21) Appl. No.: 11/963,848

(22) Filed: Dec. 24, 2007

(65) Prior Publication Data

US 2009/0012729 A1    Jan. 8, 2009

Related U.S. Application Data

(63) Continuation of application No. PCT/JP2006/314303, filed on Jul. 19, 2006.

(30) Foreign Application Priority Data

Jul. 26, 2005    (JP) .............................. 2005-216044

(51) Int. Cl.
*G01N 37/00* (2006.01)
(52) U.S. Cl. ...................... 702/40; 702/82; 250/227.23; 398/140
(58) Field of Classification Search .................. 324/753
See application file for complete search history.

(56) References Cited

FOREIGN PATENT DOCUMENTS

| JP | 61-167250 | 7/1986 |
|---|---|---|
| JP | 07-264142 | 10/1995 |
| JP | 10-271064 | 10/1998 |
| JP | 2000-201113 | 7/2000 |
| JP | 2001-197129 | 7/2001 |
| JP | 2005-025768 | 1/2005 |

*Primary Examiner*—Drew A Dunn
*Assistant Examiner*—Hien X Vo
(74) *Attorney, Agent, or Firm*—Jianq Chyun IP Office

(57) ABSTRACT

An optical receiving apparatus that receives an optical signal and outputs a data value of digital data transmitted by the optical signal is provided, including a light receiving element that receives the optical signal and outputs a photocurrent according to a strength of the optical signal, a present cycle integrator that integrates the photocurrent corresponding to a present cycle of the digital data over a prescribed period within the cycle, a previous cycle integrator that integrates the photocurrent corresponding to a cycle prior to the present cycle over a period that is substantially equal to the prescribed period in the cycle, and a data value identifying circuit that outputs a data value of the present cycle of the digital data based on a difference between a charge amount obtained through integration by the present cycle integrator and a charge amount obtained through integration by the previous cycle integrator.

15 Claims, 9 Drawing Sheets

LIGHT RECEIVING APPARATUS, TESTING APPARATUS, LIGHT RECEIVING METHOD, TESTING METHOD, TEST MODULE AND SEMICONDUCTOR CHIP

CROSS REFERENCE TO RELATED APPLICATION

This is a continuation application of PCT/JP2006/314303 filed on Jul. 19, 2006 which claims priority from a Japanese Patent Application NO. 2005-216044 filed on Jul. 26, 2005, the contents of which are incorporated herein by reference.

BACKGROUND

1. Technical Field

The present invention relates to an optical receiving apparatus, a test apparatus, an optical receiving method, a testing method, a test module, and a semiconductor chip. More particularly, the present invention relates to an optical receiving apparatus that outputs a data value of digital data transmitted by an optical signal and to a test apparatus that tests a device under test such as a semiconductor circuit.

2. Related Art

Conventionally, an optical receiving apparatus used for optical communication converts a weak photoinduced current generated by a photodiode that receives an optical signal into a voltage signal through an impedance conversion circuit. Because of the small current value of the current, a current path from the photo diode until the impedance converting circuit is a place in which the S/N ratio of the signal decays remarkably. Furthermore, resistance to common mode noise is low.

Furthermore, because a pulse output by a laser diode on a side of an optical transmission apparatus has rising and falling times that are asymmetrical, timing jitter increases because of intersymbol interference. In addition, because temperature drift in an optical system is large in comparison to an electronic circuit, a clock data recovery type (CDR type) is often employed and data is normally transmitted with an AC connection type. Because of this, encoding is necessary so that the low frequency cutoff of the transmission system is not exceeded.

The aforementioned problems cause a limited bandwidth of the optical receiving apparatus, an increased size of the transmission electronic circuit, and overall complication. Where the size of the signal processing circuit is large for every channel, cost-performance is worsened in a case where optical transmission is executed in parallel.

As opposed to the problems in such optical transmission, in a case of electrical transmission, a circuit that calculates charge on a side of the receiving circuit to decrease intersymbol interference is known as in, for example, Japanese Patent Application Publication No. 2005-25768, pgs. 17-18, FIG. 15. Such a circuit decreases the intersymbol interference by obtaining a difference between the charge charged by a previous cycle of a signal waveform and the charge charged by a present cycle of the signal waveform.

In conventional optical transmission, however, the aforementioned problems of intersymbol interference, noise, and low frequency cutoff of the transmission system are not solved.

SUMMARY

Therefore, it is an object of an aspect of the innovations herein to provide an optical receiving apparatus, a test apparatus, an optical receiving method, a testing method, a test module, and a semiconductor chip, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary apparatus may include an optical receiving apparatus that receives an optical signal and outputs a data value of digital data transmitted by the optical signal. The optical receiving apparatus includes a light receiving element that receives the optical signal and outputs a photocurrent according to a strength of the optical signal, a first present cycle integrator that integrates the photocurrent corresponding to a present cycle of the digital data over a prescribed period within the cycle, a first previous cycle integrator that integrates the photocurrent corresponding to a cycle prior to the cycle integrated by the first present cycle integrator over a period that is substantially equal to the prescribed period in the cycle, and a first data value identifying circuit that identifies and outputs a data value of the present cycle of the digital data based on a difference between an integrated value obtained through integration by the first present cycle integrator and an integrated obtained through integration by the previous cycle integrator.

According to a second aspect related to the innovations herein, one exemplary apparatus may include a test apparatus that tests a device under test. The test apparatus includes a test head onto which the device under test is placed, a main body section that performs digital data transfer with the device under test via the test head and makes a judgment concerning pass/fail of the device under test, optical sending apparatuses disposed in the test head and the main body section that send the digital data to be transmitted as an optical signal, and optical receiving apparatuses disposed in the test head and the main body section that receive the optical signal and output a data value of the digital data transmitted through the optical signal. In the test apparatus, the optical receiving apparatus includes a light receiving element that receives the optical signal and outputs a photocurrent according to a strength of the optical signal, a first present cycle integrator that integrates the photocurrent corresponding to a present cycle of the digital data over a prescribed period within the cycle, a first previous cycle integrator that integrates the photocurrent corresponding to a cycle prior to the present cycle over a period that is substantially equal to the prescribed period in the cycle, and a first data value identifying circuit that identifies and outputs a data value of the present cycle of the digital data based on a difference between the integrated value obtained through integration by the first present cycle integrator and the integrated value obtained through integration by the first previous cycle integrator.

According to a third aspect related to the innovations herein, one exemplary method may include an optical receiving method for receiving an optical signal and outputting a data value of digital data transmitted by the optical signal. The optical receiving method includes receiving the optical signal and outputting a photocurrent according to a strength of the optical signal using a light receiving element, integrating the photocurrent corresponding to a present cycle of the digital data over a prescribed period within the cycle, integrating the photocurrent corresponding to a cycle prior to the present cycle over a period that is substantially equal to the prescribed period in the cycle, and identifying and outputting a data value of the present cycle of the digital data based on a difference between an integrated value obtained in the step of integrating the present cycle and an integrated value obtained in the step of integrating the previous cycle.

According to a fourth aspect related to the innovations herein, one exemplary method may include a testing method for testing a device under test. The testing method includes placing the device under test onto a test head of a test apparatus, performing digital data transfer with the device under test via the test head and making a judgment concerning pass/fail of the device under test using a main body section of the test apparatus, sending the digital data to be transmitted as an optical signal using optical sending apparatuses disposed in the test head and the main body section, and receiving the optical signal and outputting a data value of the digital data transmitted through the optical signal using optical receiving apparatuses disposed in the test head and the main body section. In the testing method, the receiving step includes receiving the optical signal and outputting a photocurrent according to a strength of the optical signal using a light receiving element of the optical receiving apparatus, integrating the photocurrent corresponding to a present cycle of the digital data over a prescribed period within the cycle, integrating the photocurrent corresponding to a cycle prior to the present cycle over a period that is substantially equal to the prescribed period in the cycle, and identifying and outputting a data value of the present cycle of the digital data based on a difference between an integrated value obtained in the step of integrating the present cycle and an integrated value obtained in the step of integrating the previous cycle.

According to a fifth aspect related to the innovations herein, one exemplary apparatus may include a test module, disposed on a test apparatus that tests a device under test, that receives an optical signal and outputs a data value of digital data transmitted by the optical signal. The test module includes a light receiving element that receives the optical signal and outputs a photocurrent according to a strength of the optical signal, a first present cycle integrator that integrates the photocurrent corresponding to a present cycle of the digital data over a prescribed period within the cycle, a first previous cycle integrator that integrates the photocurrent corresponding to a cycle prior to the cycle integrated by the first present cycle integrator over a period that is substantially equal to the prescribed period in the cycle, and a first data value identifying circuit that identifies and outputs a data value of the present cycle of the digital data based on a difference between an integrated value obtained through integration by the first present cycle integrator and an integrated value obtained through integration by the first previous cycle integrator.

According to a sixth aspect related to the innovations herein, one exemplary apparatus may include a semiconductor chip comprising an optical receiving apparatus that receives an optical signal and outputs a data value of digital data transmitted by the optical signal provided on a semiconductor substrate. In the semiconductor chip, the optical receiving apparatus includes a light receiving element that receives the optical signal and outputs a photocurrent according to a strength of the optical signal, a first present cycle integrator that integrates the photocurrent corresponding to a present cycle of the digital data over a prescribed period within the cycle, a first previous cycle integrator that integrates the photocurrent corresponding to a cycle prior to the cycle integrated by the first present cycle integrator over a period that is substantially equal to the prescribed period in the cycle, and a first data value identifying circuit that identifies and outputs a data value of the present cycle of the digital data based on a difference between an integrated value obtained through integration by the first present cycle integrator and an integrated value obtained through integration by the first previous cycle integrator.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
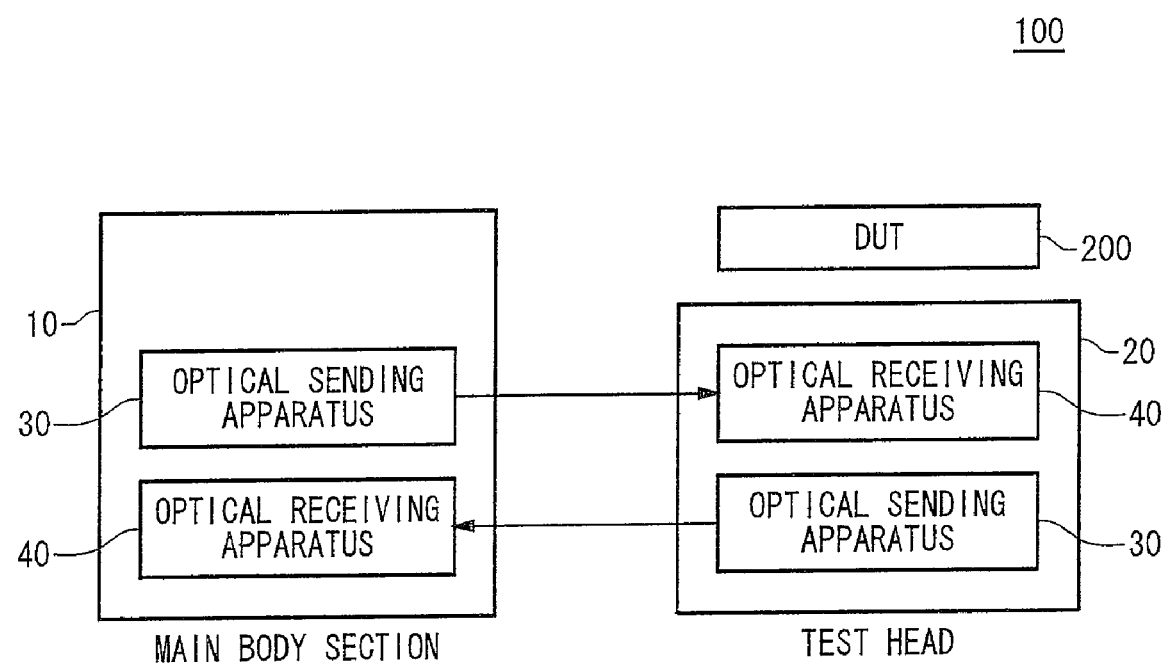
FIG. 1 shows an exemplary configuration of a test apparatus 100 according to an embodiment of the present invention.

FIG. 1 shows an exemplary configuration of a test apparatus 100 according to an embodiment of the present invention. The test apparatus 100 is an apparatus for testing a device under test 200 such as a semiconductor circuit and is provided with a main body section 10 and a test head 20. The test head 20 is placed on the device under test 200 and performs signal transfer with the device under test 200.

Furthermore, the main body section 10 performs signal transfer with the device under test 200 via the test head 20 and makes a judgment concerning pass/fail of the device under test 200. For example, the main body section 10 supplies to the device under test 200 a test signal to be input into the device under test 200 via the test head 20 and receives an output signal output by the device under test 200 via the test head 20. The main body section 10 then makes a judgment concerning pass/fail of the device under test 200 based on the output signal.

Furthermore, the main body section 10 and the test head 20 are each provided with an optical sending apparatus 30 and an optical receiving apparatus 40 for transmitting signals. The optical sending apparatus 30 and the optical receiving apparatus 40 transmit optical signals via a plurality of optical fibers that connect the main body section 10 and the test head 20. Because a space between the main body section 10 and the test head 20 is a short distance no greater than 10 m, for example, a plurality of optical fibers can be disposed in parallel at a low cost. The optical sending apparatus 30 can use a widely known apparatus.

In the present embodiment, the main body section 10 and the test head 20 are each provided with the optical sending apparatus 30 and the optical receiving apparatus 40 to transmit signals therebetween, but the test apparatus 100 may be provided with a test module, which is provided with at least one of the optical sending apparatus 30 and the optical receiving apparatus 40, at a desired location. For example, the test module may be provided at a desired location at which the signals can be transmitted using the optical fibers.

Figure 2:
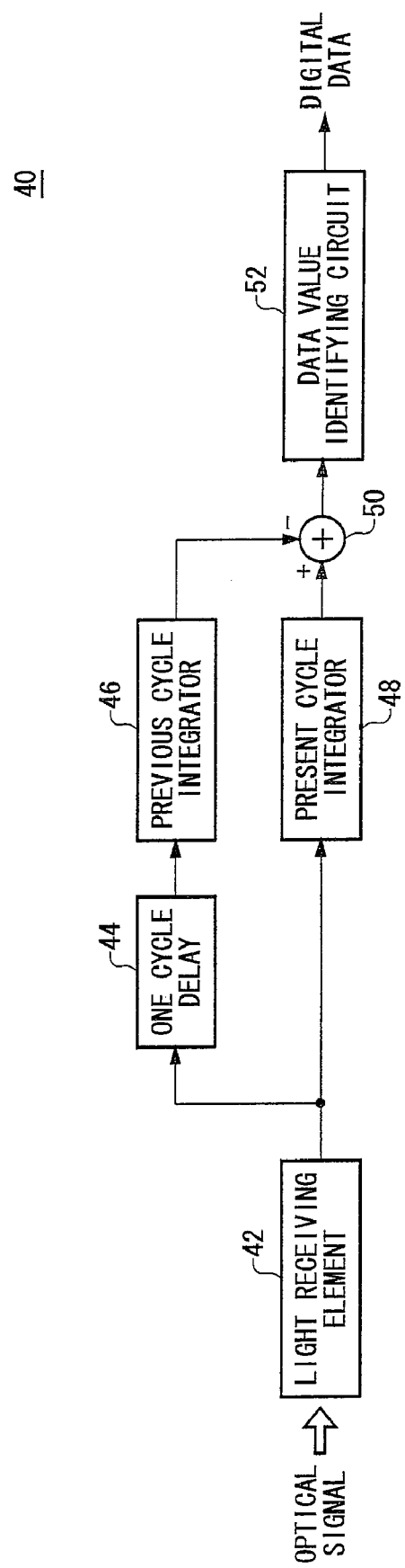
FIG. 2 shows an example of a functional block diagram of an optical receiving apparatus 40.

FIG. 2 shows an example of a functional block diagram of the optical receiving apparatus 40. The optical receiving apparatus 40 is an apparatus that receives the optical signal sent by the optical sending apparatus 30 and outputs a data value of digital data sent by the optical signal and is provided with a light receiving element 42, a one cycle delay element 44, a previous cycle integrator 46, a present cycle integrator 48, a difference calculator 50, and a data value identifying circuit 52.

The light receiving element 42 receives the optical signal and outputs a photocurrent according to a strength of the optical signal. For example, the light receiving element 42 is a photodiode. In other words, the photocurrent output by the light receiving element 42 changes according to changes in the data values of each data cycle of the digital data sent through the optical signal.

The present cycle integrator 48 integrates the photocurrent corresponding to the present cycle of digital data over a prescribed period within the cycle. For example, the present cycle integrator 48 includes a capacitor that is charged or discharged by the photocurrent, supplies the photocurrent to the capacitor during all periods of the cycle, and integrates the photocurrent by the amount of charge accumulated in the capacitor.

The one cycle delay element 44 delays the photocurrent output by the light receiving element 42 by one data cycle of the digital data and supplies the delayed photocurrent to the previous cycle integrator 46. The previous cycle integrator 46 integrates the photocurrent corresponding to a data cycle prior to the present cycle, in which the present cycle integrator 48 integrates the photocurrent, over a period substantially equal to the aforementioned prescribed period in the data cycle. For example, the previous cycle integrator 46 includes a capacitor that is charged or discharged by the photocurrent, supplies the photocurrent to the capacitor during all periods of the cycle, and integrates the photocurrent by the amount of charge accumulated in the capacitor.

The difference calculator 50 calculates a difference between the amount of charge obtained through integration of the photocurrent in the present cycle by the present cycle integrator 48 and the amount of charge obtained through integration of the photocurrent in the previous cycle by the previous cycle integrator 46. In the present embodiment, the difference calculator 50 subtracts the amount of charge obtained through integration by the previous cycle integrator 46 from the amount of charge obtained through integration by the present cycle integrator 48.

The data value identifying circuit 52 outputs the data value of the present cycle of the digital data based on the difference calculated by the difference calculator 50. For example, in a case where the amount of charge obtained through integration by the present cycle integrator 48 is greater than the amount of charge obtained through integration by the previous cycle integrator 46, the data value identifying circuit 52 outputs H-level as the data value of the present cycle of the digital data. Furthermore, in a case where the amount of charge obtained through integration by the present cycle integrator 48 is less than the amount of charge obtained through integration by the previous cycle integrator 46, the data value identifying circuit 52 outputs L-level as the data value of the present cycle of the digital data. Yet further, in a case where the amount of charge obtained through integration by the present cycle integrator 48 is substantially equal to the amount of charge obtained through integration by the previous cycle integrator 46, the data value identifying circuit 52 outputs the data value of the previous cycle as the data value of the present cycle.

Figure 3:
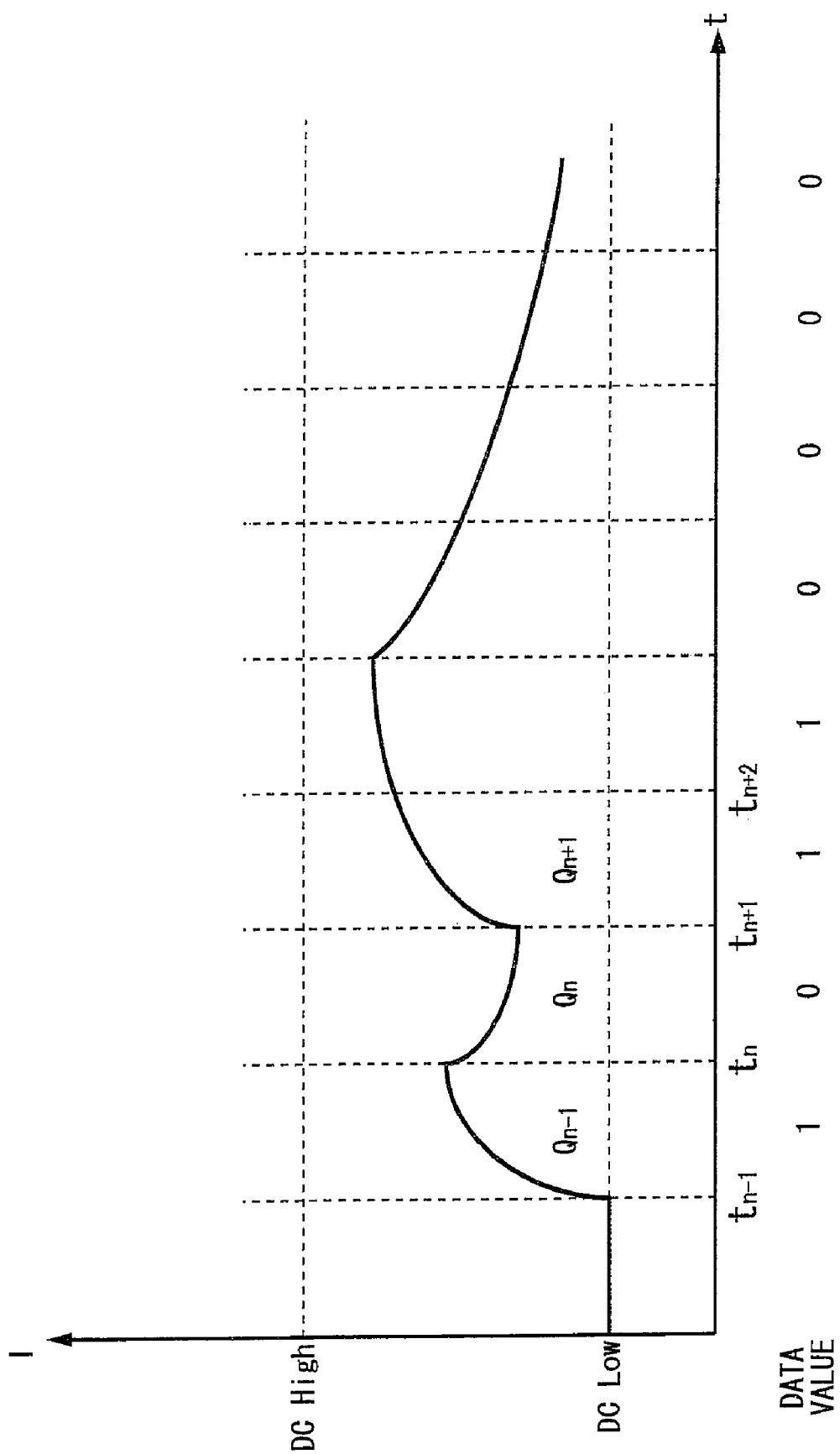
FIG. 3 shows an exemplary waveform of a photocurrent output by a light receiving element 42.

FIG. 3 shows an exemplary waveform of the photocurrent output by the light receiving element 42. In FIG. 3, the horizontal axis represents time and the vertical axis represents a current value. In the present embodiment, the digital data transmitted through the optical signal includes a prescribed data cycle ($t_{n-1} \sim t_n$, $t_n \sim t_{n+1}$, ...). Where the present data cycle is set to be [$t_n \sim t_{n+1}$], the present cycle integrator 48 integrates the photocurrent in the present cycle. The amount of charge Qn, which is obtained by integrating the photocurrent in the present cycle, is represented by the surface area of the waveform of the current in the present cycle.

Furthermore, the previous cycle integrator 46 integrates the photocurrent in the previous cycle [$t_{n-1} \sim t_n$]. The amount of charge $Q_{n-1}$, which is obtained by integrating the photocurrent in the previous cycle, is represented by the surface area of the waveform of the current in the previous cycle.

Because the waveform of the photocurrent generated by the light receiving element 42, such as a photodiode, has a prescribed rising time and a prescribed falling time, where the data cycle is short, there are cases where the current waveform does not settle into the prescribed H-level or L-level as shown in FIG. 3. In such cases, the data values cannot be accurately demodulated where the photocurrent is demodulated by the current value or a voltage value obtained by converting the current value.

However, as in the optical receiving apparatus 40 shown in FIG. 2, the data value of the present cycle can be accurately identified by comparing the integral value of the photocurrent in the previous cycle to the integral value of the photocurrent in the present cycle. For example, in a case where the integral value of the photocurrent in the present cycle is greater than the integral value of the photocurrent in the previous cycle, the data value of at least the present cycle can be identified as one because the aforementioned case indicates that the photocurrent is increasing.

In the same manner, in a case where the integral value of the photocurrent in the present cycle is less than the integral value of the photocurrent in the previous cycle, the data value of at least the present cycle can be identified as zero because the aforementioned case indicates that the photocurrent is decreasing. Furthermore, in a case where the integral value of the photocurrent in the present cycle is equal to the integral value of the photocurrent in the previous cycle, the data value of the present cycle can be identified as being the same as the data value of the previous cycle because the aforementioned case indicates that the current value of the photocurrent is saturated.

In the manner described above, the optical receiving apparatus 40 compares the integral value of the photocurrent of the present cycle to the integral value of the photocurrent of the previous cycle and identifies the data value of the present cycle based on a comparison result, so that the data value can be accurately identified even in a case where the photocurrent is not settled. Furthermore, even in a case where a long period drift in the data rate is superimposed on the photocurrent due to temperature fluctuation, device degradation, or the like, the effect of the drift can be made very small because the integral values of the photocurrents between consecutive cycles are compared.

Furthermore, in a case where, for example, a data value of one continues for a long period, the current value of the photocurrent is saturated. In such a case, the data value is misidentified where a drift component that decreases the current value arises. Therefore, it is desirable that the data value identifying circuit 52 calculate a comparison result in which the amounts of charge are equal in a case where the difference between the amount of charge obtained through integration by the present cycle integrator 48 and the amount of charge obtained through integration by the previous cycle integrator 46 is within a predetermined allowable range. The allowable range may be determined in advance based on an allowable value for each single data cycle of the drift component superimposed on the photocurrent.

Figure 4:
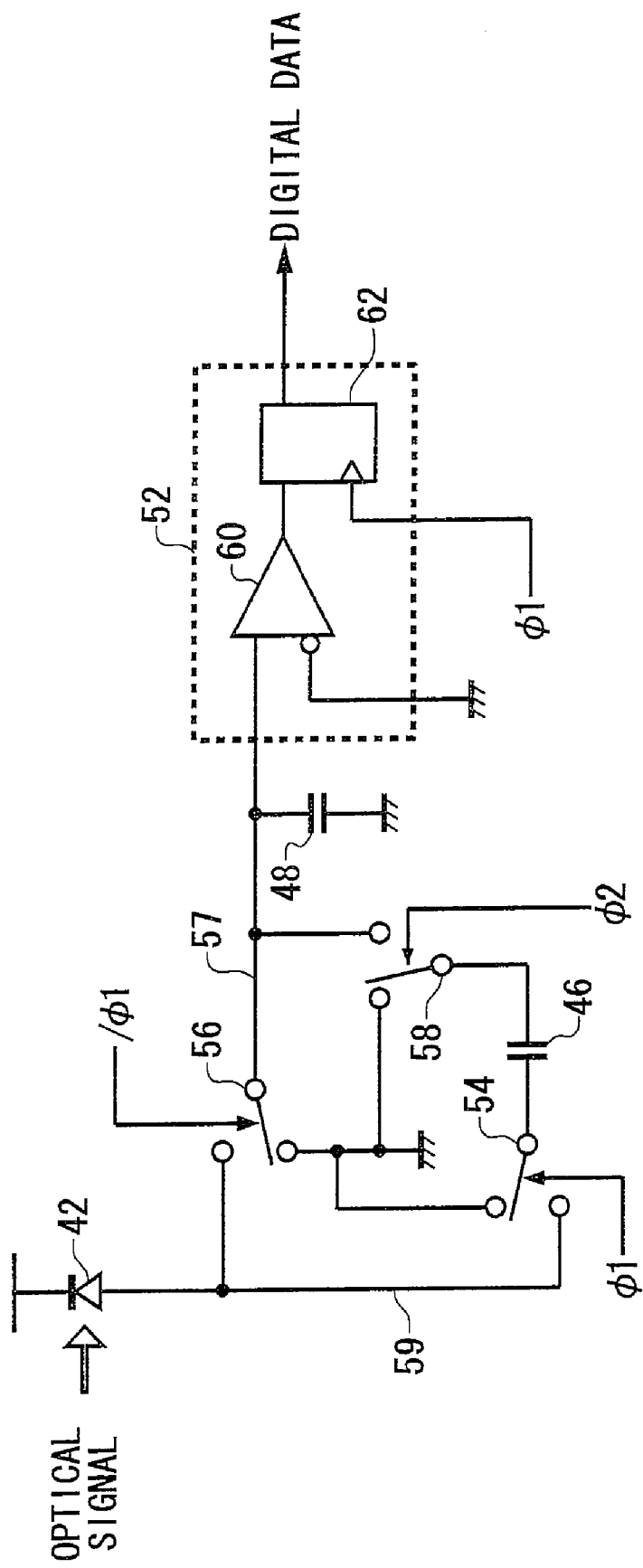
FIG. 4 shows an exemplary circuit configuration of the optical receiving apparatus 40.

FIG. 4 shows an exemplary circuit configuration of the optical receiving apparatus 40. The optical receiving apparatus 40 is provided with the light receiving element 42, the previous cycle integrator 46, the present cycle integrator 48, a first switch 54, a second switch 56, a third switch 58, a present cycle transmission path 57, a previous cycle transmission path 59, and the data value identifying circuit 52. In FIG. 4, structural elements are given the same numbering as FIG. 2 and have the same or similar functions and configuration as the structural elements described in FIG. 2.

The optical receiving apparatus 40 may be formed on a semiconductor chip. For example, the semiconductor chip may have a signal transmitting apparatus 40 provided on a semiconductor substrate. Furthermore, a portion of the structure of the optical receiving apparatus 40 may be formed on the semiconductor chip.

The present cycle transmission path 57 connects a current output terminal of the light receiving element 42 to a voltage input terminal of the data value identifying circuit 52. The present cycle integrator 48 is a capacitor and is disposed in parallel with the voltage input terminal of the data value identifying circuit 52 between the present cycle transmission path 57 and a prescribed reference potential. The following description uses a ground potential as the reference potential, but the reference potential is not limited to the ground potential.

The previous cycle transmission path 59 is disposed in parallel with the present cycle transmission path 57 and connects the current output terminal of the light receiving element 42 to the voltage input terminal of the data value identifying circuit 52. The previous cycle integrator 46 is a condenser and is disposed serially with the voltage input terminal of the data value identifying circuit 52 in a path of the previous cycle transmission path 59.

The first switch 54 is disposed between the light receiving element 42 and the previous cycle integrator 46 in the previous cycle transmission path 59. Furthermore, the first switch 54 switches whether the terminal of the previous cycle integrator 46 on the side of the light receiving element 42 connects to the light receiving element 42 or the ground potential. In other words, the first switch 54 functions as a previous cycle control section that switches whether or not the photocurrent in the previous cycle is supplied to the previous cycle integrator 46.

The second switch 56 is disposed between the light receiving element 42 and the present cycle integrator 48 in the present cycle transmission path 57. Furthermore, the second switch 56 switches whether the terminal of the present cycle integrator 48 on the side of the light receiving element 42 connects to the light receiving element 42 or the ground potential. In other words, the second switch 56 functions as a present cycle control section that switches whether or not the photocurrent in the present cycle is supplied to the present cycle integrator 48.

The third switch 58 is disposed between the previous cycle integrator 46 and the present cycle integrator 48 in the previous cycle transmission path 59. Furthermore, the third switch 58 switches whether the terminal of the previous cycle integrator 46 on the side of the data value identifying circuit 52 connects to the terminal of the present cycle integrator 48 on the side of the light receiving element 42 or the ground potential. In other words, the third switch 58 functions as a difference control section that connects the terminal at which the positive or negative charge of the present cycle integrator 48 is accumulated to the terminal at which the positive or negative charge of the previous cycle integrator 46 is accumulated in the present cycle and switches whether or not the present cycle integrator 48 is discharged according to the amount of charge accumulated by the previous cycle integrator. By discharging the present cycle integrator 48, a difference in the amount of charge, which is the amount of charge of the previous cycle depleted from the amount of charge of the present cycle, is accumulated in the present cycle integrator 48.

The data value identifying circuit 52 includes a logic identifier 60 and a flip-flop 62. The logic identifier 60 has a positive input terminal connected to the present cycle integrator 48 and a negative input terminal connected to the ground potential. In other words, the logic identifier 60 makes a judgement as to whether the voltage according to the amount of charge of the difference accumulated in the present cycle integrator 48 is positive or negative. In a case where the voltage of the present cycle integrator 48 is positive, the logic identifier 60 supplies an H-level signal to the flip-flop 62, and in a case where the voltage of the present cycle integrator 48 is negative, the logic identifier 60 supplies an L-level signal to the flip-flop 62. Here, it is desirable that the logic identifier 60 be a Schmitt trigger amplifier having hysteresis characteristics.

The flip-flop 62 acquires and outputs the signal output by the logic identifier 60 according to a supplied clock. Furthermore, in a case where the voltage of the present cycle integrator 48 is substantially zero, the output of the logic identifier 60 becomes high impedance and the flip-flop 62 holds and outputs the data value of the previous cycle. Through such a configuration, the data value of the digital data transmitted through the optical signal can be output. Furthermore, through the optical receiving apparatus 40 of the present embodiment, a direct current component of the signal can also be transmitted because the data value identifying circuit 52 and the present cycle integrator 48 are disposed in parallel.

Figure 5:
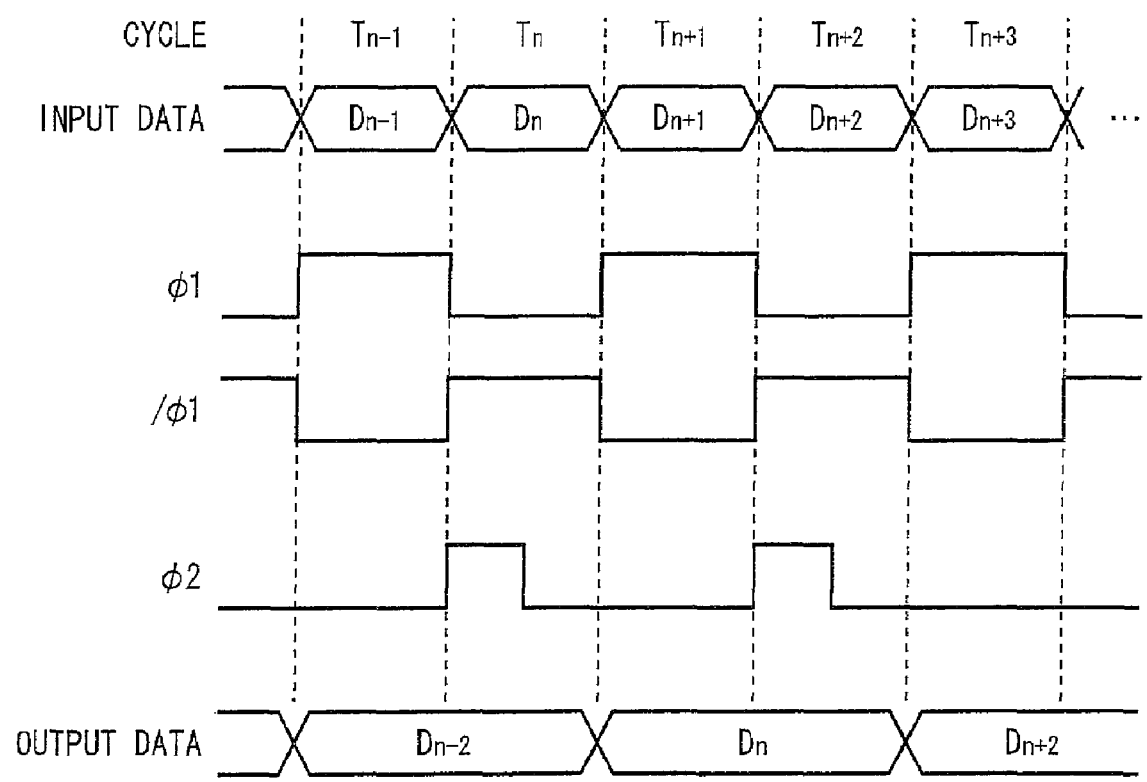
FIG. 5 is a timing chart showing an exemplary operation of the optical receiving apparatus 40 shown in FIG. 4.

FIG. 5 is a timing chart showing an exemplary operation of the optical receiving apparatus 40 shown in FIG. 4. An optical signal that transmits input data including a prescribed data cycle is supplied to the optical receiving apparatus 40. The optical receiving apparatus 40 generates control clocks φ1,/φ1, φ2 that control the first switch 54, the second switch 56, and the third switch 58. The control clocks may be generated based on a source synchronous clock provided in a manner to be synchronized with the input data. It is desirable that the optical receiving apparatus 40 be further provided with a clock generating section that generates the control clocks based on the source synchronous clock.

The signal control clock φ1 and the signal control clock/φ1 are clocks that include periods that are double the data rate of the input data. Furthermore, the control clock/φ1 is a clock obtained by inverting the control clock φ1. The control clock φ2 is a clock obtained by compressing a pulse width of the control clock/φ1.

The following is a description of a case where the optical receiving apparatus 40 shown in FIG. 4 is made to operate using the aforementioned control clocks. In a case where the control clock φ1 is H-level, the first switch 54 connects the previous cycle integrator 46 to the light receiving element 42, and in a case where the control clock φ1 is L-level, the first switch 54 connects the previous cycle integrator 46 to the ground potential. Furthermore, in a case where the control clock/φ1 is H-level, the second switch 56 connects the present cycle integrator 48 to the light receiving element 42, and in a case where the control clock/φ1 is L-level, the second switch 56 connects the present cycle integrator 48 to the ground potential. Yet further, in a case where the control clock φ2 is H-level, the third switch 58 connects the previous cycle integrator 46 to the present cycle integrator 48, and in a case where the control clock φ2 is L-level, the third switch 58 connects the previous cycle integrator 46 to the ground potential.

For example, in a case where the present cycle is $T_n$ and the previous cycle is $T_{n-1}$, the first switch 54 is in an "on" condition and the second switch 56 and the third switch 58 are in an "off" condition in the previous cycle. Therefore, both ends of the present cycle integrator 48 are connected to the ground potential, so that the charge accumulated in the present cycle integrator 48 becomes zero. Furthermore, the terminal of the previous cycle integrator 46 on the side of the light receiving element 42 is connected to the light receiving element 42 and the other terminal of the previous cycle integrator 46 is connected to the ground potential. In the cycle immediately before the aforementioned cycle, because the first switch 54 and the third switch 58 are in the "off" condition, the amount of accumulated charge of the previous cycle integrator 46 at a time when the aforementioned cycle begins is substantially zero. Therefore, an amount of charge according to the photocurrent of the aforementioned cycle is accumulated in the light receiving element 42 side terminal of the previous cycle integrator 46.

Next, the first switch 54 becomes in the "off" condition and the second switch 56 becomes in the "on" condition in the present cycle. Furthermore, the third switch 58 becomes in the "on" condition for a prescribed period from the start of the aforementioned cycle. Therefore, the present cycle integrator 48 is connected to the light receiving element 42, so that the present cycle integrator 48 is charged by the photocurrent of the aforementioned cycle. Furthermore, the present cycle integrator 48 is connected to the previous cycle integrator 46 for a prescribed period via the third switch 58. At this time, because charge amounts having opposite signs are accumulated in the terminals of the connected present cycle integrator 48 and previous cycle integrator 46, the present cycle integrator 48 discharges according to the amount of accumulated charge of the previous cycle integrator 46. Therefore, the charge accumulated in the present cycle integrator 48 is the difference between the amount of charge obtained by integrating the photocurrent of the present cycle and the amount of charge obtained by integrating the photocurrent of the previous cycle.

Then, the logic identifier 60 makes a judgment as to whether the voltage of the present cycle integrator 48 is positive or negative. Furthermore, the flip-flop 62 acquires at the next cycle ($T_{n+1}$) the comparison result output by the logic identifier 60 according to the control clock φ1 and outputs the acquired comparison result as the data value (Dn) of the digital data.

Through such control, the effect of intersymbol interference can be reduced, so that the data value of the digital data can be accurately identified. Furthermore, in the present embodiment, as shown in FIG. 5, every other data value of the digital data is identified, but in other examples, two of the circuits shown in FIG. 4 may be disposed in parallel to identify both the data values of even cycles and the data values of odd cycles of the digital data.

Figure 6:
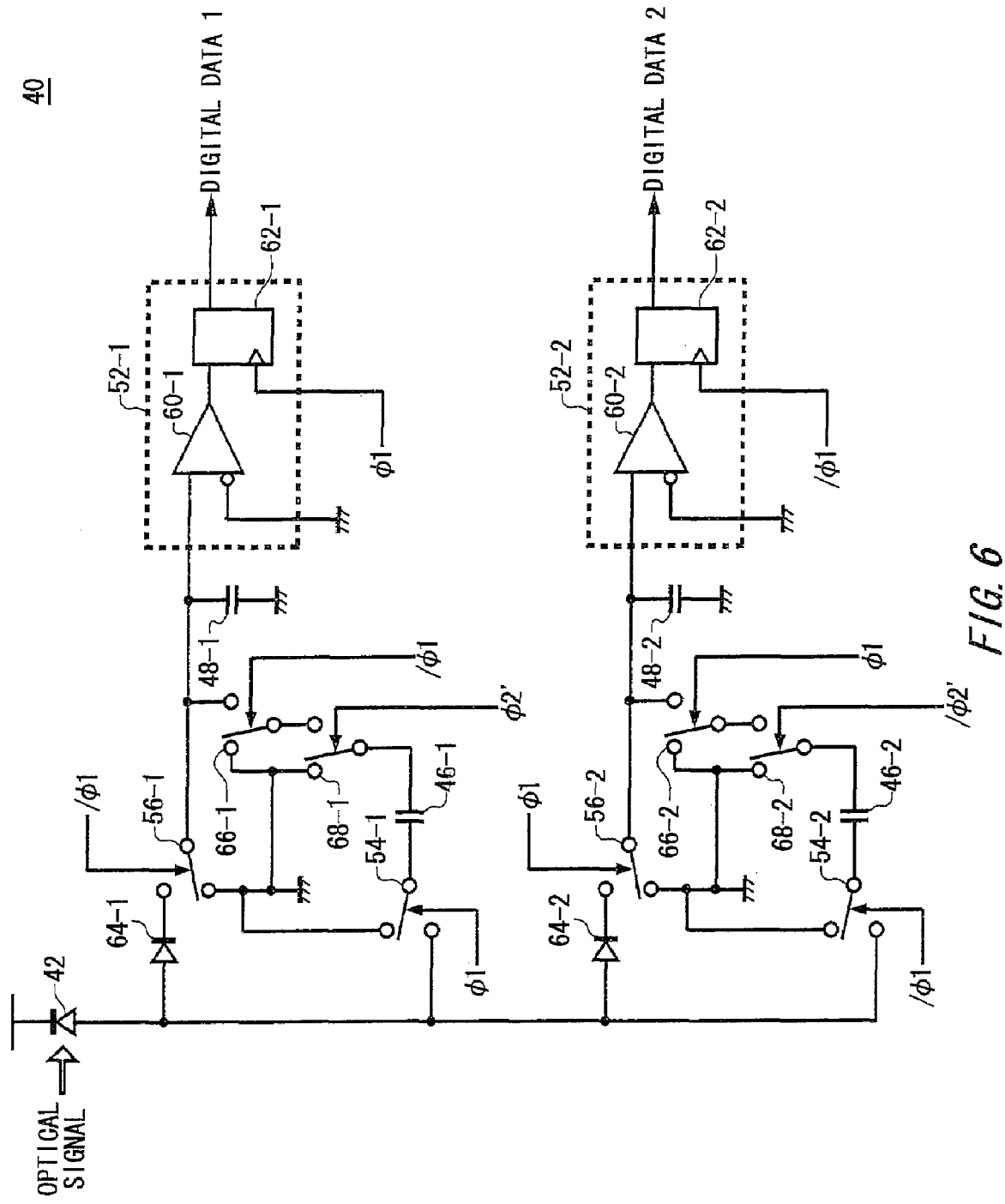
FIG. 6 shows another exemplary configuration of the optical receiving apparatus 40.

FIG. 6 shows another exemplary configuration of the optical receiving apparatus 40. The optical receiving apparatus 40 according to the present embodiment is provided with a first circuit and a second circuit disposed in parallel in relation to the light receiving element 42 and substantially equal to the circuit of the optical receiving apparatus 40 shown in FIG. 4 having the light receiving element 42 removed. The first circuit identifies the data values in even cycles of the digital data and the second circuit identifies the data values of odd cycles of the digital data.

The first circuit and the second circuit are provided with a fourth switch 66 and a fifth switch 68 in place of the third switch 58 in the circuit shown in FIG. 4. The fourth switch 66 and the fifth switch 68 are disposed serially between the previous cycle integrator 46 and the present cycle integrator 48, connect the previous cycle integrator 46 to the present cycle integrator 48 in a case where both switches are in the "on" condition, and connect the previous cycle integrator 46 to the ground potential in a case where at least one of the switches is in the "off" condition.

Furthermore, in the first circuit, the fourth switch 66 is controlled by the control clock/φ1 and the fifth switch 68 is controlled by a control clock φ2'. In the present embodiment, the control clock φ2' is a clock obtained by shifting the control clock φ1 by a phase that is substantially half of the data rate. In other words, in a case where a logical sum of the control clock/φ1 and the control clock φ2' is H-level, the fourth switch 66 and the fifth switch 68 connect the previous cycle integrator 46 to the present cycle integrator 48, but the logical sum of the control clock/φ1 and the control clock φ2' is equal to the control clock described in FIG. 5 and the operation of the fourth switch 66 and the fifth switch 68 is the same as the operation of the third switch 58 shown in FIG. 4.

Furthermore, other switches in the first circuit are controlled by the same control clocks as the corresponding switches in the optical receiving apparatus 40 shown in FIG. 4. Each switch in the second circuit is controlled by a control clock obtained by inverting the control clock of the corresponding switch in the first circuit. It is desirable that a diode 64 be disposed in the present cycle transmission path of both the first circuit and the second circuit to prevent current flow between the first circuit and the second circuit. The diode 64 may also be disposed in the previous cycle transmission path of both the first circuit and the second circuit.

Figure 7:
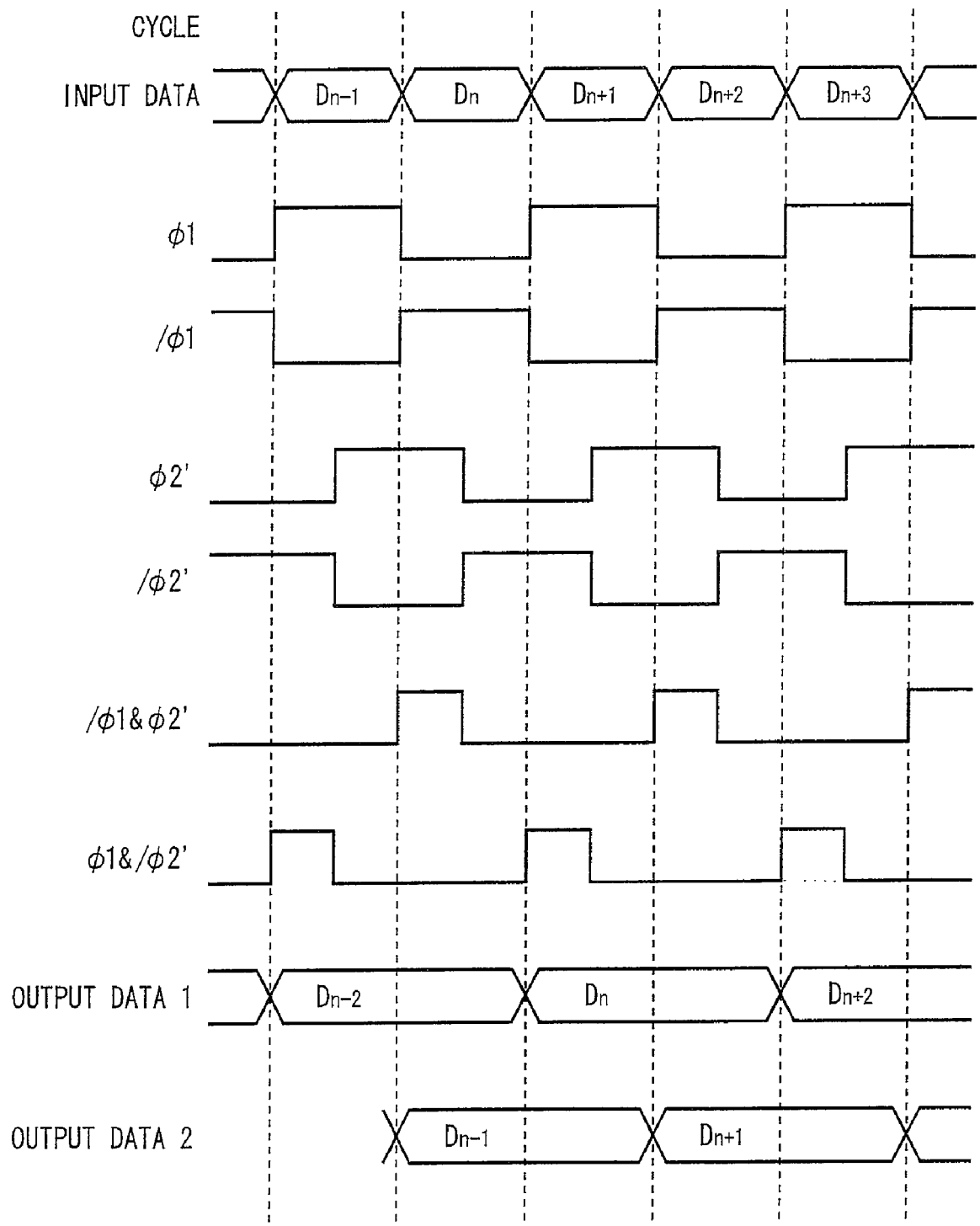
FIG. 7 is a timing chart showing an exemplary operation of the optical receiving apparatus 40 shown in FIG. 6.

FIG. 7 is a timing chart showing an exemplary operation of the optical receiving apparatus 40 shown in FIG. 6. The operation of the first circuit is the same as the operation of the optical receiving apparatus 40 shown in FIG. 5. The first circuit outputs the data values of even cycles of the digital data as output data 1.

Because the second circuit is controlled by the control clock obtained by inverting the control clock of the first circuit, the second circuit executes the same operation as the first circuit with a delay of one data cycle. Therefore, the second circuit outputs the data values of the odd cycles of the digital data as output data 2. Through such a configuration, the optical receiving apparatus 40 can accurately identify all of the data values of the digital data.

Figure 8:
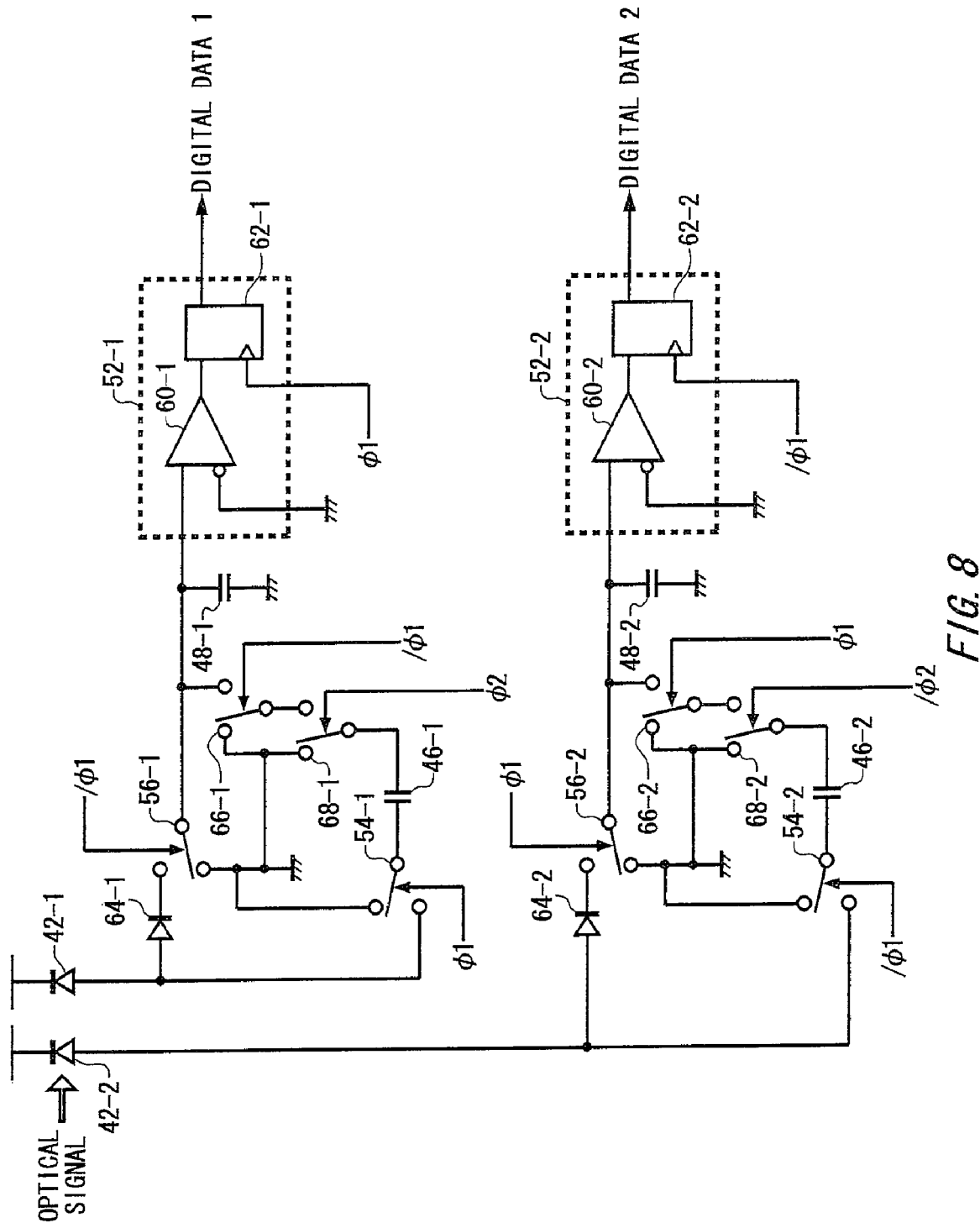
FIG. 8 shows another exemplary configuration of the optical receiving apparatus 40.

FIG. 8 shows another exemplary configuration of the optical receiving apparatus 40. The optical receiving apparatus 40 according to the present embodiment is independently provided with the first circuit and the second circuit having substantially the same configuration as the optical receiving apparatus 40 described in FIG. 4. The control clocks that control the first circuit and the second circuit are the same as those of the first circuit and the second circuit described in FIG. 6. Through such a configuration, the first circuit identifies the data values of the even cycles of the digital data and the second circuit identifies the data values of the odd cycles of the digital data. Therefore, the optical receiving apparatus 40 can accurately identify all of the data values of the digital data.

Figure 9:
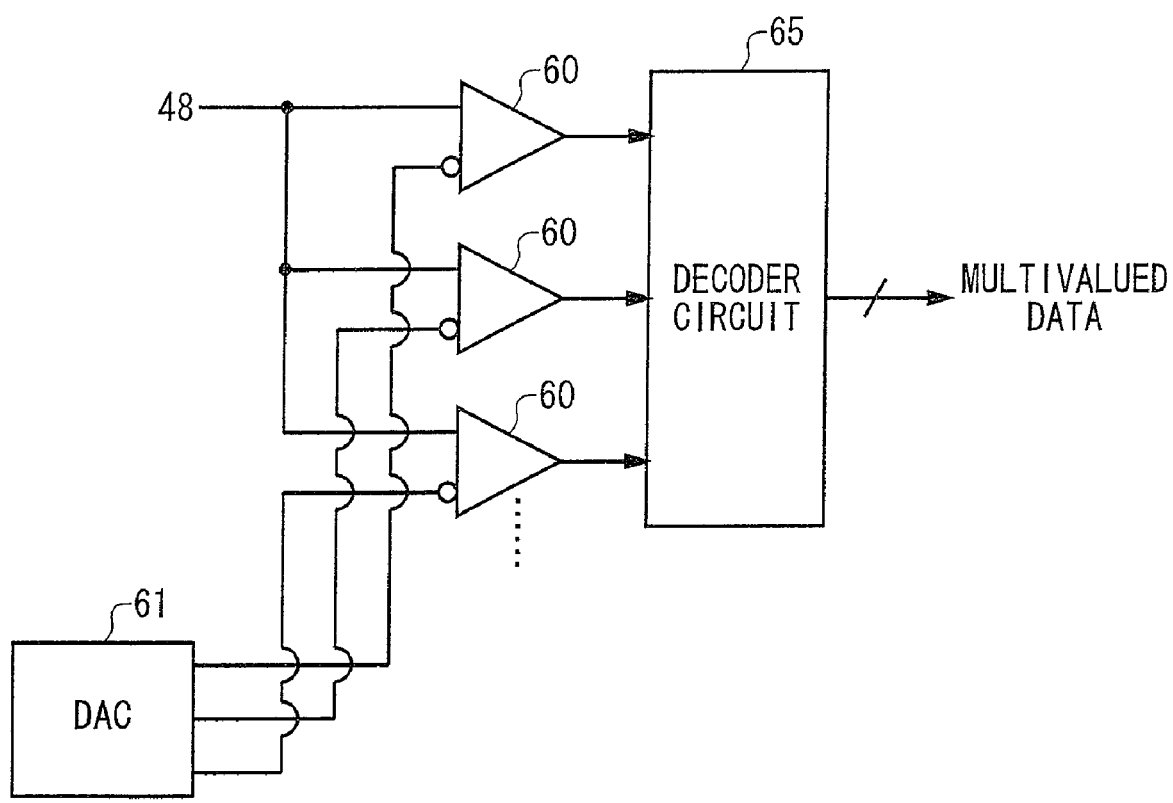
FIG. 9 shows another exemplary configuration of a data value identifying circuit 52.

FIG. 9 shows another exemplary configuration of the data value identifying circuit 52. The optical receiving apparatus 40 of the present embodiment receives digital data in which the data values change to a plurality of types of values. The data value identifying circuit 52 includes a plurality of logic identifiers 60, a DAC 61, and a decoder circuit 65.

The plurality of logic identifiers 60 identifies the amount of change in the data values of the digital data. The amount of change in the data value is represented by a difference between the amount of charge obtained by integrating the photocurrent of the previous cycle and the amount of charge obtained by integrating the photocurrent of the present cycle. Therefore, a range voltage corresponding to each amount of change is supplied to each logic identifier 60 from a DAC 70, and each logic identifier 60 compares the received range voltage to the voltage of the present cycle integrator 48.

The decoder circuit 65 calculates the amount of change in the data values of the digital data between the previous cycle and the present cycle based on a comparison result from each logic identifier 60. Furthermore, it is desirable that the decoder circuit 65 hold the data value of the previous cycle. The decoder circuit 65 identifies and outputs the data value of the present cycle based on the calculated amount of change in the data value and the data value of the previous cycle. Through such a configuration, multivalued digital data can be accurately identified.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

As made clear from the above description, through embodiments of the present invention, a "name of the invention" can be realized that ####. Data values of digital data transmitted by optical transmission can be accurately identified by decreasing the effect of intersymbol interference or the like.

What is claimed is:

1. An optical receiving apparatus that receives an optical signal and outputs a data value of digital data transmitted by the optical signal, comprising:

a light receiving element that receives the optical signal and outputs a photocurrent according to a strength of the optical signal;

a first present cycle integrator that integrates the photocurrent corresponding to a present cycle of the digital data over a prescribed period within the cycle;

a first previous cycle integrator that integrates the photocurrent corresponding to a cycle prior to the cycle integrated by the first present cycle integrator over a period that is substantially equal to the prescribed period in the cycle; and a first data value identifying circuit that identifies and outputs a data value of the present cycle of the digital data based on a difference between an integrated value obtained through integration by the first present cycle integrator and an integrated obtained through integration by the previous cycle integrator.

2. The optical receiving apparatus according to claim 1, wherein the first present cycle integrator includes a capacitor that is disposed between a present cycle transmission path that connects a current output end of the light receiving element to a voltage input end of the first data value identifying circuit and a prescribed reference potential.

3. The optical receiving apparatus according to claim 2, wherein the first previous cycle integrator includes a capacitor disposed in parallel with the present cycle transmission path between the current output end of the light receiving element and the voltage input end of the first data value identifying circuit.

4. The optical receiving apparatus according to claim 1, further comprising:

a previous cycle control section that supplies the photocurrent of the previous cycle to the first previous cycle integrator;

a present cycle control section that supplies the photocurrent of the present cycle to the first present cycle integrator; and a difference control section that, in the present cycle, connects a terminal of the first present cycle integrator accumulating a positive charge to a terminal of the first previous cycle integrator accumulating a negative charge and causes the first present cycle integrator to discharge according to an integrated value accumulated by the first previous cycle integrator.

5. The optical receiving apparatus according to claim 4, wherein the previous cycle control section includes a first switch that switches whether a terminal of the first previous cycle integrator on a side of the light receiving element is connected to the light receiving element or the reference potential, the present cycle control section includes a second switch that switches whether a terminal of the first present cycle integrator on a side of the light receiving element is connected to the light receiving element or the reference potential, and the difference control section includes a third switch that switches whether a terminal of the first previous cycle integrator on a side of the first data value identifying circuit is connected to the terminal of the first present cycle integrator on a side of the light receiving element or the reference potential.

6. The optical receiving apparatus according to claim 1, wherein the first data value identifying circuit outputs an H-level as the data value of the present cycle in a case where the integrated value obtained through integration by the first present cycle integrator is greater than the integrated value obtained through integration by the first previous cycle integrator, outputs an L-level as the data value of the present cycle in a case where the integrated value obtained through integration by the first present cycle integrator is less than the integrated value obtained through integration by the first previous cycle integrator, and outputs the data value of the previous cycle as the data value of the present cycle in a case where the integrated value obtained through integration by the first present cycle integrator is substantially equal to the integrated value obtained through integration by the first previous cycle integrator.

7. The optical receiving apparatus according to claim 6, wherein
the first present cycle integrator integrates the photocurrent corresponding to an even cycle of the digital data over a prescribed period within the cycle,
the first previous cycle integrator integrates the photocurrent corresponding to a cycle prior to the cycle integrated by the first present cycle integrator over a period that is substantially equal to the prescribed period in the cycle,
the first data value identifying circuit identifies and outputs a data value of the even cycle of the digital data based on a difference between the integrated value obtained through integration by the first present cycle integrator and the integrated value obtained through integration by the first previous cycle integrator; and
the optical receiving apparatus further comprises:
a second present cycle integrator that integrates the photocurrent corresponding to an odd cycle of the digital data over a period that is substantially equal to the prescribed period in the cycle;
a second previous cycle integrator that integrates the photocurrent corresponding to a cycle prior to the cycle integrated by the second present cycle integrator over a period that is substantially equal to the prescribed period in the cycle; and
a second data value identifying circuit that identifies and outputs a data value of the odd cycle of the digital data based on a difference between the integrated value obtained through integration by the second present cycle integrator and the integrated value obtained through integration by the second previous cycle integrator.

8. A test apparatus that tests a device under test, comprising:
a test head onto which the device under test is placed;
a main body section that performs digital data transfer with the device under test via the test head and makes a judgment concerning pass/fail of the device under test;
optical sending apparatuses disposed in the test head and the main body section that send the digital data to be transmitted as an optical signal; and
optical receiving apparatuses disposed in the test head and the main body section that receive the optical signal and output a data value of the digital data transmitted through the optical signal, wherein the optical receiving apparatus includes
a light receiving element that receives the optical signal and outputs a photocurrent according to a strength of the optical signal,
a first present cycle integrator that integrates the photocurrent corresponding to a present cycle of the digital data over a prescribed period within the cycle,
a first previous cycle integrator that integrates the photocurrent corresponding to a cycle prior to the present cycle over a period that is substantially equal to the prescribed period in the cycle, and
a first data value identifying circuit that identifies and outputs a data value of the present cycle of the digital data based on a difference between the integrated value obtained through integration by the first present cycle integrator and the integrated value obtained through integration by the first previous cycle integrator.

9. The test apparatus according to claim 8, wherein
the first present cycle integrator integrates the photocurrent corresponding to an even cycle of the digital data over a prescribed period within the cycle,
the photocurrent corresponding to a cycle prior to the cycle integrated by the first present cycle integrator is integrated over a period that is substantially equal to the prescribed period in the cycle,
the first data value identifying circuit identifies and outputs a data value of the even cycle of the digital data based on a difference between the integrated value obtained through integration by the first present cycle integrator and the integrated value obtained through integration by the first previous cycle integrator, and
the optical receiving apparatus further comprises:
a second present cycle integrator that integrates the photocurrent corresponding to an odd cycle of the digital data over a period that is substantially equal to the prescribed period in the cycle;
a second previous cycle integrator that integrates the photocurrent corresponding to a cycle prior to the cycle integrated by the second present cycle integrator over a period that is substantially equal to the prescribed period in the cycle; and
a second data value identifying circuit that outputs a data value of the odd cycle of the digital data based on a difference between the integrated value obtained through integration by the second present cycle integrator and the integrated value obtained through integration by the second previous cycle integrator.

10. An optical receiving method for receiving an optical signal and outputting a data value of digital data transmitted by the optical signal, comprising:
receiving the optical signal and outputting a photocurrent according to a strength of the optical signal using a light receiving element;
integrating the photocurrent corresponding to a present cycle of the digital data over a prescribed period within the cycle;
integrating the photocurrent corresponding to a cycle prior to the present cycle over a period that is substantially equal to the prescribed period in the cycle; and
identifying and outputting a data value of the present cycle of the digital data based on a difference between an integrated value obtained in the step of integrating the present cycle and an integrated value obtained in the step of integrating the previous cycle.

11. A testing method for testing a device under test, comprising:
placing the device under test onto a test head of a test apparatus;
performing digital data transfer with the device under test via the test head and making a judgment concerning pass/fail of the device under test using a main body section of the test apparatus;
sending the digital data to be transmitted as an optical signal using optical sending apparatuses disposed in the test head and the main body section; and
receiving the optical signal and outputting a data value of the digital data transmitted through the optical signal using optical receiving apparatuses disposed in the test head and the main body section, wherein the receiving step includes
receiving the optical signal and outputting a photocurrent according to a strength of the optical signal using a light receiving element of the optical receiving apparatus, integrating the photocurrent corresponding to a present cycle of the digital data over a prescribed period within the cycle, integrating the photocurrent corresponding to a cycle prior to the present cycle over a period that is substantially equal to the prescribed period in the cycle, and identifying and outputting a data value of the present cycle of the digital data based on a difference between an integrated value obtained in the step of integrating the present cycle and an integrated value obtained in the step of integrating the previous cycle.

12. A test module, disposed on a test apparatus that tests a device under test, that receives an optical signal and outputs a data value of digital data transmitted by the optical signal, comprising:

a light receiving element that receives the optical signal and outputs a photocurrent according to a strength of the optical signal;

a first present cycle integrator that integrates the photocurrent corresponding to a present cycle of the digital data over a prescribed period within the cycle;

a first previous cycle integrator that integrates the photocurrent corresponding to a cycle prior to the cycle integrated by the first present cycle integrator over a period that is substantially equal to the prescribed period in the cycle; and a first data value identifying circuit that identifies and outputs a data value of the present cycle of the digital data based on a difference between an integrated value obtained through integration by the first present cycle integrator and an integrated value obtained through integration by the first previous cycle integrator.

13. The test module according to claim 12, wherein the first present cycle integrator integrates the photocurrent corresponding to an even cycle of the digital data over a prescribed period within the cycle, the first previous cycle integrator integrates the photocurrent corresponding to a cycle prior to the cycle integrated by the first present cycle integrator over a period that is substantially equal to the prescribed period in the cycle, the first data value identifying circuit identifies and outputs a data value of the even cycle of the digital data based on a difference between the integrated value obtained through integration by the first present cycle integrator and the integrated value obtained through integration by the first previous cycle integrator, and the test module further comprises:

a second present cycle integrator that integrates the photocurrent corresponding to an odd cycle of the digital data over a period that is substantially equal to the prescribed period in the cycle;

a second previous cycle integrator that integrates the photocurrent corresponding to a cycle prior to the cycle integrated by the second present cycle integrator over a period that is substantially equal to the prescribed period in the cycle; and a second data value identifying circuit that outputs a data value of the odd cycle of the digital data based on a difference between the integrated value obtained through integration by the second present cycle integrator and the integrated value obtained through integration by the second previous cycle integrator.

14. A semiconductor chip comprising an optical receiving apparatus that receives an optical signal and outputs a data value of digital data transmitted by the optical signal provided on a semiconductor substrate, wherein the optical receiving apparatus includes:

a light receiving element that receives the optical signal and outputs a photocurrent according to a strength of the optical signal;

a first present cycle integrator that integrates the photocurrent corresponding to a present cycle of the digital data over a prescribed period within the cycle;

a first previous cycle integrator that integrates the photocurrent corresponding to a cycle prior to the cycle integrated by the first present cycle integrator over a period that is substantially equal to the prescribed period in the cycle; and a first data value identifying circuit that identifies and outputs a data value of the present cycle of the digital data based on a difference between an integrated value obtained through integration by the first present cycle integrator and an integrated value obtained through integration by the first previous cycle integrator.

15. The semiconductor chip according to claim 14, wherein the first present cycle integrator integrates the photocurrent corresponding to an even cycle of the digital data over a prescribed period within the cycle, the first previous cycle integrator integrates the photocurrent corresponding to a cycle prior to the cycle integrated by the first present cycle integrator over a period that is substantially equal to the prescribed period in the cycle, the first data value identifying circuit identifies and outputs a data value of the even cycle of the digital data based on a difference between the integrated value obtained through integration by the first present cycle integrator and the integrated value obtained through integration by the first previous cycle integrator, and the test optical receiving apparatus further comprises:

a second present cycle integrator that integrates the photocurrent corresponding to an odd cycle of the digital data over a period that is substantially equal to the prescribed period in the cycle;

a second previous cycle integrator that integrates the photocurrent corresponding to a cycle prior to the cycle integrated by the second present cycle integrator over a period that is substantially equal to the prescribed period in the cycle; and a second data value identifying circuit that outputs a data value of the odd cycle of the digital data based on a difference between the integrated value obtained through integration by the second present cycle integrator and the integrated value obtained through integration by the second previous cycle integrator.

* * * * *